(No Model.)
A. LEVEDAHL.
WHEEL.
No. 480,022. Patented Aug. 2, 1892.
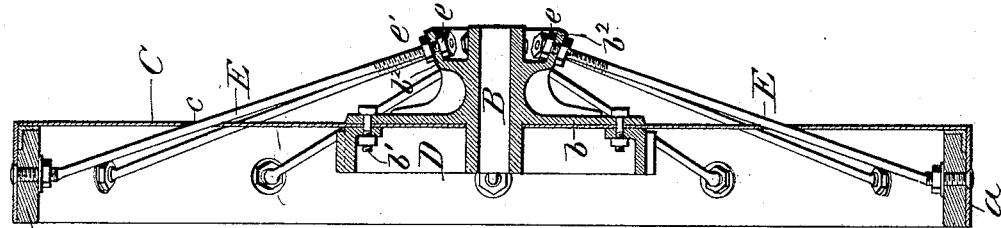
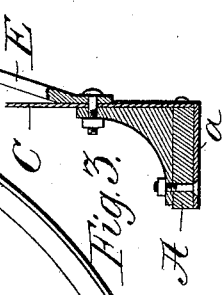
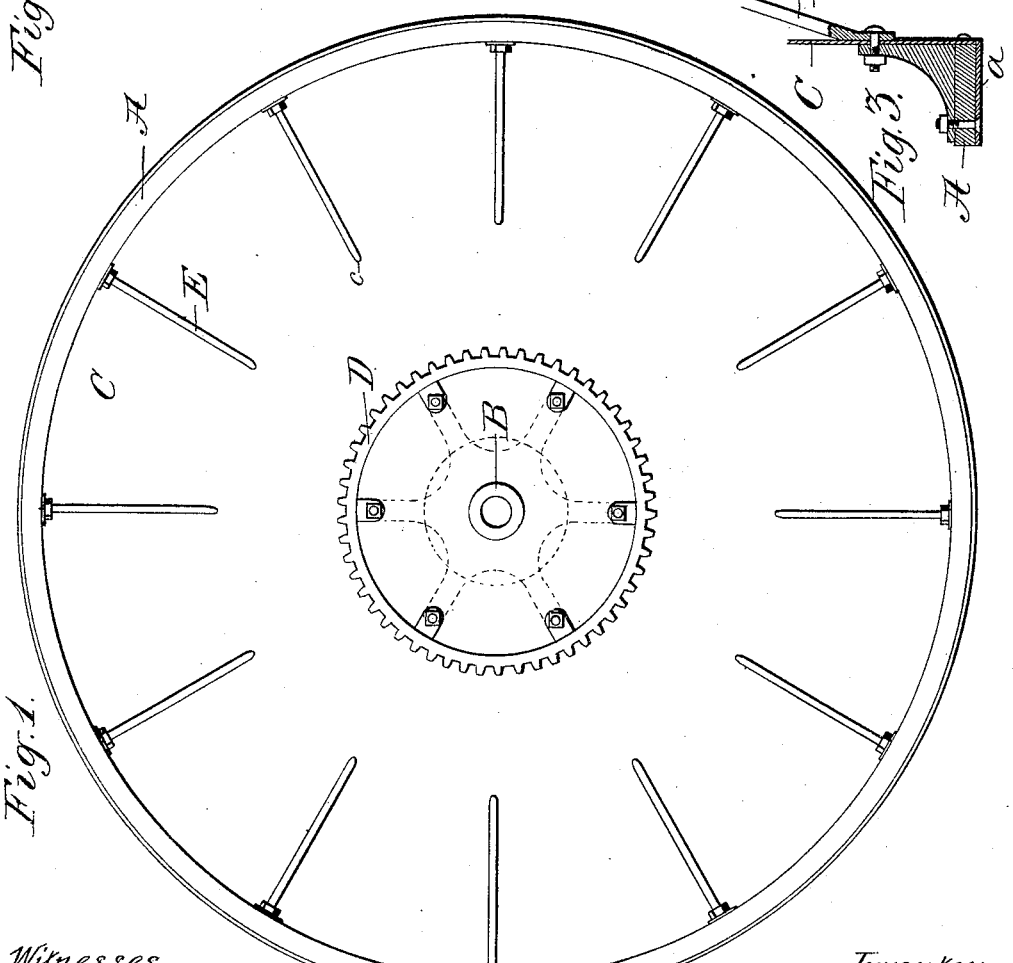
Witnesses
Samuel Kit
C. E. Tomlinson
Inventor
Axel Levedahl,
by Dayton, Poole & Brown,
Attorneys
THE NORRIS PETERS CO., PHOTO-LITHO., WASHINGTON, D. C.

UNITED STATES PATENT OFFICE.

AXEL LEVEDAHL, OF AURORA, ILLINOIS, ASSIGNOR TO THE GARDNER SEWING MACHINE COMPANY, OF SAME PLACE.

WHEEL.

SPECIFICATION forming part of Letters Patent No. 480,022, dated August 2, 1892.

Application filed April 21, 1892. Serial No. 430,107. (No model.)

*To all whom it may concern:*

Be it known that I, AXEL LEVEDAHL, of Aurora, in the county of Kane and State of Illinois, have invented certain new and useful Improvements in Wheels; and I do hereby declare that the following is a full, clear, and exact description thereof, reference being had to the accompanying drawings, and to the letters of reference marked thereon, which form a part of this specification.

This invention has for its object to provide a construction in wheels for agricultural implements and analogous uses adapted to bring the tread within or partially within the transverse space occupied by the burden borne by the wheel.

In several kinds of agricultural implements, and especially in implements intended to operate upon plants growing in rows, a definite limitation is placed upon the width of the implement or upon the distance between the treads of the wheels of such implement by the distance between the rows. In other words, the wheels of the implement must travel between the rows of plants and the distance between these rows determines the width of the track of such implement. Many such implements, however, require for the proper construction, arrangement, and efficiency of their machinery a wider space than is afforded between the wheels of ordinary construction when made to track properly between the rows of plants. This is particularly true of cotton-harvesters, for example. To obtain the desired space for machinery of proper size it has hitherto been found necessary, in some cases, to mount the machinery upon four-wheeled vehicles and between the front and rear wheels thereof, when, if a suitable space were available between two wheels, a two-wheel mounting would be preferable.

By the present invention I present a construction of wheel which, when made of suitable diameter, will afford a material enlargement of the space available for machinery located between them, so that the latter may have correspondingly-larger dimensions or otherwise varied construction or arrangement that may be desired and that calls for such larger space.

In the accompanying drawings, which illustrate my invention, Figure 1 is a side elevation of a wheel containing my invention, its inner surface being presented to the eye. Fig. 2 is a central vertical section. Fig. 3 is a detail illustrating a modification.

A represents the rim of the wheel, and B its hub.

C is a flat sheet-metal plate attached to the rim A at or near its outer edge, and B is the wheel-hub secured to the plate A. In the present case the hub B is shown as extending inside the plate C and to about a medium plane of the rim A, because in the particular kind of machine for which this exact construction is designed — namely, cotton-harvesters — the wheel is provided with an interior driving gear-wheel D, which extends inwardly from the plate C the distance stated, and the hub B may therefore, in this particular case, extend inwardly to the inner plane of said gear-wheel. The hub may, in other cases, extend even farther inward, provided the particular space occupied by it is not wanted for the machinery, or said hub may terminate at its inner end in the plane of the plate C, and thus afford even more room between the inner ends of the hub than is provided in the particular instance illustrated. The hub in any case extends outwardly beyond the plane of the plate C, and for its support, additional to that derived from its connection with the plate C, is attached at its outer projecting part to braces E E. As said braces are herein shown, they connect the outer end of the hub with the median line of the rim A, extending through the plate C at the points *c c*, where the plate is apertured for the purpose. In this construction the space within the rim A is partly taken up near the margin of the wheel by said braces. This is not objectionable for a cotton-harvester; but if in this or other cases it shall be desired to utilize this marginal interior space of the wheel the braces E may proceed from the rim at points nearer its outer edge than shown in the drawings or from the outer surface of the plate C itself, as indicated by dotted lines in Fig. 2 and by Fig. 3.

When practicable, the construction illustrated in full lines in Fig. 2 is preferable, for the obvious reason that the braces connected with the wheel-rim between its edges give better support to the latter and allow the said rim to be made of lighter weight or less thickness without liability to yield.

The rim A may be of iron, but is preferably of wood, having an iron tire $a$. The plate C is of sheet metal and is bolted or similarly secured both to the rim and to the hub. Being held taut and flat, it may be very thin and the wheel may therefore be extremely light, notwithstanding it will usually be several feet in diameter. To adapt the hub for attachment to the sheet-metal plate C, said hub is provided with the wide flange $b$, which overlaps the plate any desired distance and is fastened to the latter by bolts or rivets $b'$. For the attachment of the braces E to the hub the latter is provided with the beveled flange $b^2$, through holes in which said braces pass to receive the nuts, set-nuts $e'$ being applied to said braces externally to the flange.

I claim as my invention—

1. The wheel, substantially as described, consisting of a rim, a flat sheet-metal plate secured to the rim at or near its outer margin, a hub secured to the said metal plate, and braces connecting the body of the wheel with the hub externally to the plate.

2. In combination with a wheel-rim, a flat sheet-metal plate secured to the rim at or near its outer edge, a hub secured to the plate and projecting externally thereto, and inclined braces connecting the outer end of the hub with the wheel at or near its margin.

3. In combination with a wheel-rim, a flat sheet-metal plate secured to the rim at or near its outer edge, a hub secured to the plate and projecting externally thereto, and braces connected with the outer end of the hub and passing through the plate into connection with the rim.

In testimony that I claim the foregoing as my invention I affix my signature in presence of two witnesses.

AXEL LEVEDAHL.

Witnesses:
M. E. DAYTON,
G. W. HIGGINS, Jr.